United States Patent [19]

Agarwal

[11] 4,440,509

[45] Apr. 3, 1984

[54] DETECTION OF HOT AND COLD SPOTS IN CHEMICAL REACTORS

[75] Inventor: Suresh C. Agarwal, Euclid, Ohio

[73] Assignee: The Babcock & Wilcox Company, New Orleans, La.

[21] Appl. No.: 363,200

[22] Filed: Mar. 29, 1982

[51] Int. Cl.³ .................... G01K 7/00; G01K 13/00
[52] U.S. Cl. ........................ 374/166; 340/870.17; 374/111; 374/137; 376/247; 436/149
[58] Field of Search ............. 374/137, 111, 114, 141, 374/166; 376/247, 274; 364/557; 340/870.17

[56] References Cited

U.S. PATENT DOCUMENTS

| | | | |
|---|---|---|---|
| 3,061,415 | 10/1962 | Braconier et al. | 136/202 X |
| 3,652,070 | 3/1972 | Sazara | 374/141 X |
| 3,853,482 | 12/1974 | Tej Bhan | 376/247 X |
| 3,911,747 | 10/1975 | Sivyer | 374/141 X |
| 4,044,612 | 8/1977 | Powell | 374/141 X |
| 4,176,554 | 12/1979 | Kazmierowicz | 374/137 |
| 4,186,605 | 2/1980 | Bourigault | 374/166 X |
| 4,384,793 | 5/1983 | O'Brien | 376/247 X |

*Primary Examiner*—Daniel M. Yasich
*Attorney, Agent, or Firm*—Vytas R. Matas; Robert J. Edwards

[57] ABSTRACT

An arrangement is disclosed for temperature sensors in an exothermic chemical reactor which comprises a first plurality of temperature sensors distributed at equally spaced locations along the longitudinal axis of the reactor and a second plurality of sensors distributed on a cross-sectional plane at each location. The cross-sectional geometry of the reactor at each location has a plurality of equitempered zones which are symmetrical about the longitudinal axis. The second plurality of temperature sensors is arranged so that at least one temperature sensor is provided in each equitempered zone and some of the sensors are equispaced along a radial line. In this manner, a minimum of temperature sensors is required for establishing full longitudinal and radial temperature profiles for the reactor.

5 Claims, 6 Drawing Figures

DETECTION OF HOT AND COLD SPOTS IN CHEMICAL REACTORS

FIELD AND BACKGROUND OF THE INVENTION

The present invention relates, in general, to temperature-sensing apparatus and technique for thermic reactors and, in particular, to a new and useful arrangement and technique for determining the existence of hot or cold spots in a chemical reactor.

The most economical operating temperature for an isothermal reactor is one at which the highest conversion of the primary feed stream occurs. For an exothermic (endothermic) reaction, catalyst selectivity increases (decreases) as the reaction temperature is lowered, and conversion increases (decreases) as reaction temperature is increased (decreased). Thus, temperature requirements for high selectivity and high conversion are opposed to each other. Consequently, a narrow temperature band is available for economic operation of a reactor. Furthermore, catalyst selectivity is not necessarily uniform throughout a reactor due to catalyst manufacturing and quality control techniques employed therein. This, coupled with flow characteristics, catalyst packing, reaction type and operating temperature range may result in the establishment of hot (cold) spots in a reactor.

The occurrence of hot (or cold) spots in a reactor may lead to any or all of the following problems:

1. Catalyst poisoning due to high temperature. This may result in either reducing catalyst life, or the requirement for frequent catalyst regeneration or new catalyst depending on the specific condition.
2. Reduction in conversion to desired products. Consequently, load on down stream purification units is increased.
3. Cooling (heating) fluid demand increases to meet the requirement of additional heat removal.
4. Occurrence of unsafe conditions depending on specific reactions and products.
5. Requirement for increased operator attention for unit control.

Hence, it is necessary that hot and/or cold spots in a reactor be identified quickly and accurately, and the information used in the control system for the reactor.

It is known to detect hot or cold spots in thermic reactors by using multiple temperature sensors that are installed across the length of the reactor. This gives a longitudinal temperature profile across the reactor axis. Also, maximum and minimum temperatures are determined for further use in the control system.

The drawbacks of the state of the art methodology, as described above, are:

1. Since only longitudinal temperature profile is measured, determination of maximum and minimum temperature does not necessarily reflect the true maximum and minimum temperatures in a reactor.
2. As true hot and cold spots may lie, beyond the temperature sensor locations, on a radial axis, the state of the art method does not provide an accurate means of detecting hot and cold spots.
3. In view of reactor dynamics and significantly large delay time of temperature sensors, significant time elapses before the temperature around the measuring point reaches the hot or cold region temperature. By this time, the temperature of the hot or cold spots has further increased or decreased due to the temperature profile. Hence, temperature may further increase by the time detection is made, thus placing the reactor operation in an undesirable regime.

Pertinent references which disclose temperature sensing techniques are found in U.S. Pat. Nos. 3,061,415 to Braconier et al; 3,079,372 to Falknier et al; 3,830,698 to Kleiss; and 4,008,049 to Clemmer et al.

The Falknier patent relates to a process control system wherein temperatures throughout the length of the reactor are displayed on a cathode ray oscilloscope. This reference disclosed the utilization of a plurality of thermocouples at desired intervals along the length of the reactor tubing.

The Kleiss et al reference relates to a method and apparatus for controlling the temperature in a fractionation column. This reference discloses the use of plural temperature sensors along the column length to provide meaningful measurements of the temperature gradient within the column.

The Braconier et al reference relates to a process for monitoring the progress of gas phase reactions by the use of temperature measurements in key positions and the Clemmer et al reference relates to the control of processes by detecting and measuring temperatures at key points in the process.

SUMMARY OF THE INVENTION

The present invention relates to an improved technique and arrangement of temperature sensors in an isothermal chemical reactor which, while providing, an accurate indication of the temperature profile in the reactor, both longitudinally and radially utilizes a minimum number of sensors. According to the invention, a reactor which contains an exothermic or endothermic reaction (collectively termed a thermic reaction) is provided with temperature sensors at equally spaced locations along the reactor longitudinal axis. In a cylindrical reactor having a plurality of cooling or heating medium tubes, including a central tube, along the longitudinal axis of the reactor, this first set of temperature sensors is provided at equispaced locations in the central tube.

This first plurality of temperature sensors provides a measurement of the longitudinal temperature profile in the reactor.

For establishing a radial temperature profile, again the first set of temperature sensors in the central tube or along the longitudinal axis can be utilized. In addition, and dependent on the cross-sectional geometry of the reactor at each longitudinal position, at least one additional temperature sensor is provided for each equitemperate zone. Equitemperate zones are here defined as zones in the reactor cross-sectional geometry which are symmetrical about the longitudinal axis and exhibit equal temperatures. For the cylindrical reactor with tubes as set forth above, a plurality of tubes are disposed in each of the equitemperate zone. The central tube exclusively occupies its own equitemperate zone along the longitudinal axis of the reactor. Among these additional temperature sensors for establishing the radial temperature profiles, a number of the temperature transducers at each cross-sectional location are aligned radially and positioned at equispaced locations.

Accordingly, an object of the present invention is to provide an arrangement and method for establishing longitudinal and radial temperature profiles in a reactor for containing a thermic reaction which utilizes a minimum of temperature sensors.

A further object of the invention is to provide an arrangement of temperature sensors in a reactor for containing a thermic reaction having a longitudinal axis and a cross-sectional geometry with a plurality of equitempered zones, one of said equitempered zones being at said longitudinal axis, comprising, a first plurality of temperature sensors equispaced at selected locations along the longitudinal axis and a second plurality of temperature sensors distributed on a cross-sectional plane of the reactor at each selected location with at least one temperature sensors in each equitempered zone and at least some of said second plurality of transducers lying at equispaced positions along a radial line in said plane.

Another object of the present invention is to provide an apparatus for accurate and quick detection of hot and hold spots in a multi-tubular chemical reactor having a longitudinal axis with a plurality of tubes extending parallel to said axis and at least one tube coinciding with said axis, comprising an arrangement of a plurality of temperature sensors, with a first set of temperature sensors positioned at selected equispaced locations along said longitudinal axis, the reactor having the cross-sectional geometry at each selected location with a plurality of equitempered zones symmetrical about said longitudinal axis each containing a plurality of the tubes, at least one temperature sensor disposed in at least one tube of each equitempered zone in a cross-sectional plane of the reactor at each selected location, at least some of the sensors in each cross-sectional plane being equispaced and disposed along a radial line.

A still further object of the invention is to provide a method of arranging temperature sensors in a reactor having a longitudinal axis and containing a thermic reaction, the reactor having a cross-sectional geometry with a plurality of equitempered zones symmetrical about said longitudinal axis, comprising the steps of positioning a first plurality of temperature sensors at equispaced locations along said longitudinal axis, providing a second plurality of temperature sensors on a cross-sectional plane at each selected location, at least one of said second plurality of temperature sensors disposed in each equitempered zone and at least some of said second plurality of sensors being equispaced along a radial line in each cross-sectional plane.

A further object of the invention is to provide an arrangement and apparatus for establishing accurate temperature profiles in a reactor which is simple in design, rugged in construction and economical to manufacture.

For an understanding of the principles of the invention, reference is made to the following description of typical embodiments thereof as illustrated in the accompanying drawings.

DESCRIPTION OF THE PREFERRED EMBODIMENT

Figure 1:
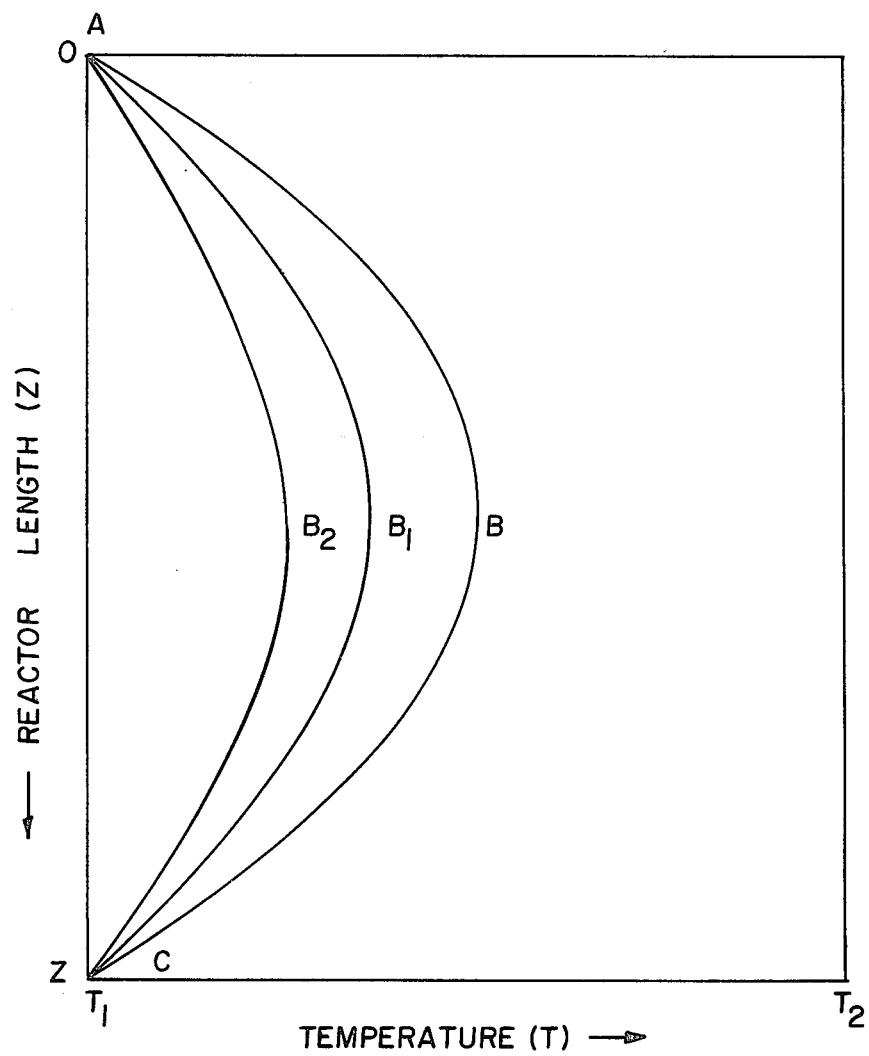
FIG. 1 is a graph showing the longitudinal temperature profile of a thermic reactor.

Referring to the drawings, in particular, the invention embodied therein comprises an arrangement and method of establishing a longitudinal and radial temperature profile of a reactor containing a thermic reaction, in particular as isothermic chemical reactor having a plurality of longitudinally extending heat-transfer medium tubes.

Figure 2:
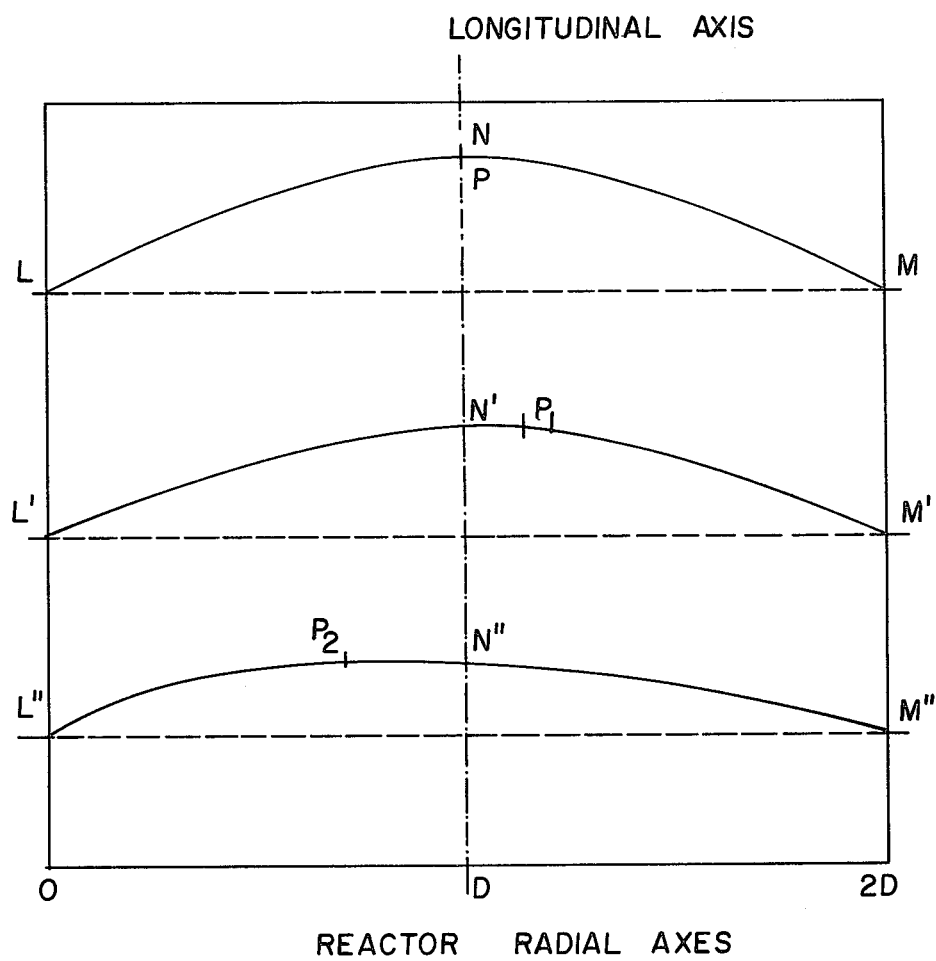
FIG. 2 is a graph showing the radial temperature profile of a thermic reactor.
Figure 3:
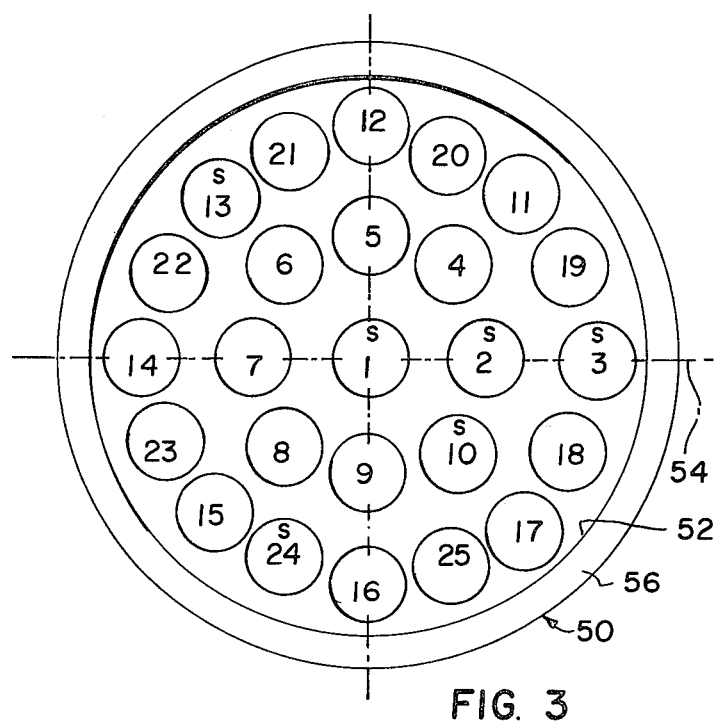
FIG. 3 is a sectional view of a tubular chemical reactor showing the arrangement of heat transfer medium tubes disposed in equitempered zones.
Figure 4:
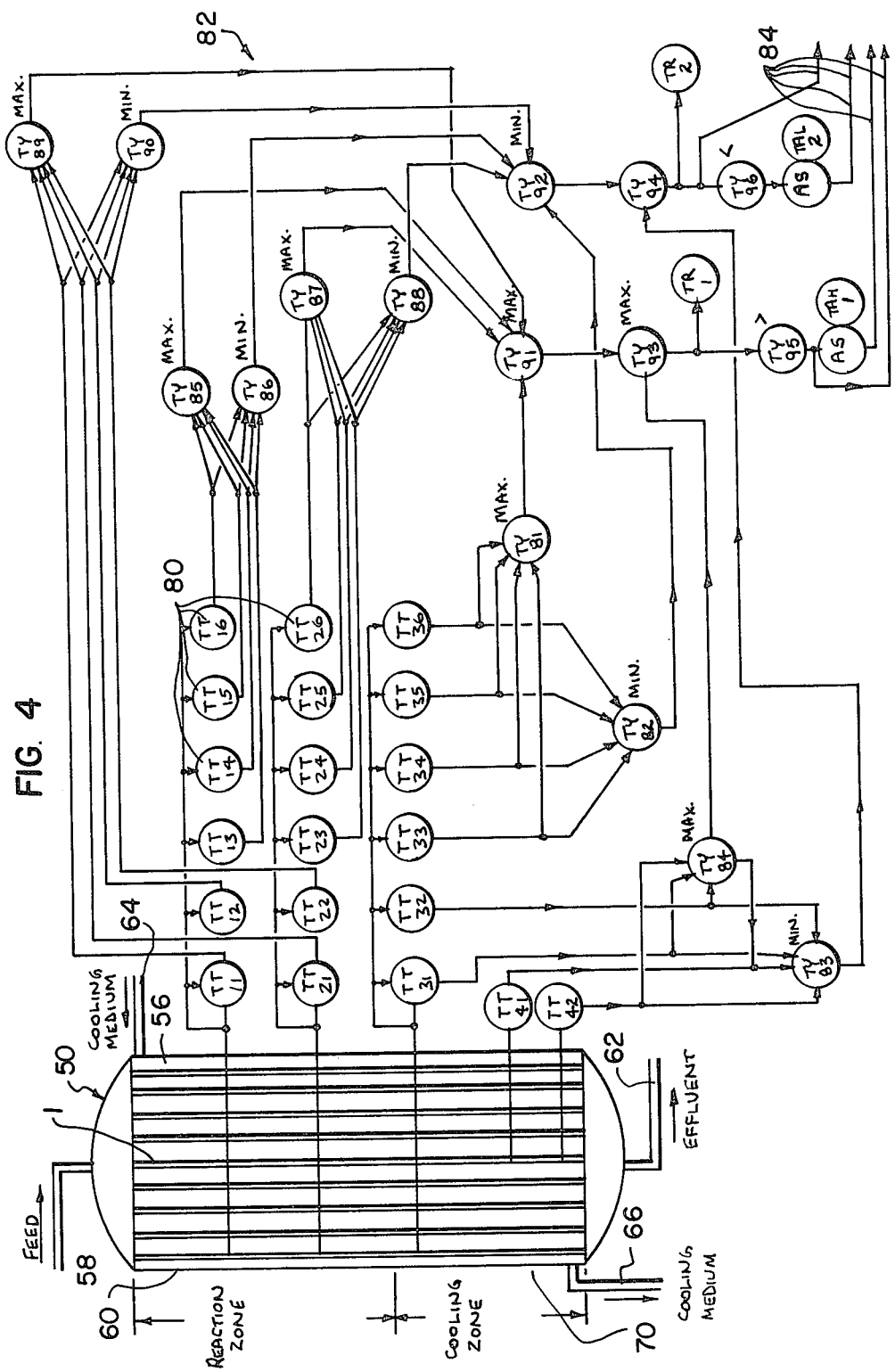
FIG. 4 is a schematic representation including a longitudinal sectional view of a reactor according to the invention.

An isothermal chemical reactor 50 in FIG. 4, has two temperature profiles: a longitudinal one and a radial one as shown in FIGS. 1 and 2 respectively. The longitudinal temperature profile is an envelope of temperatures measured across the same longitudinal axis, and these profiles change with axis location in a reactor. As shown in FIG. 1, curve ABC is the profile at the center axis while $AB_2C$ is at the reactor vessel's inside surface (52 in FIG. 3) and $AB_1C$ is at some axis between the two. The temperature peaks B, $B_1$, ... $B_2$ do not necessarily occur at the same reactor length. In practice, longitudinal hot or cold spot occurrence is dynamic (in time and space) depending on catalyst packing, length of reactor, the specific chemical reactions in the reactor and byproducts being formed. Similarly, radial temperature profiles are dynamic, i.e., radial peaks and valleys shift in place with duration of reactor operation (see peaks P, $P_1$ and $P_2$ in FIG. 2).

Thus, for an accurate detection of hot or cold spots in a reactor, a measurement of longitudinal and axial temperature profiles must be made. Hence, a large number of temperature sensors will be required.

The number of temperature sensors required for quick and accurate detection can be reduced, however, according to the invention by the mere fact that:

1. Chemical reactors are primarily cylindrical in geometry. Hence, there exists a symmetry around the central axis on a per quadrant basis. For example, FIG. 3 shows the tube layout in a reactor. By symmetry, the sets of tubes having approximately identical temperatures, that is, the tubes lying in equi-temperate zones at each cross-sectional plane through the reactor, are:

(i): 1
(ii): 2,5,7,9
(iii): 4,6,8,10
(iv): 3,12,14,16
(v): 11,13,15,17
(vi): 18,19,20,21,22,23,24,25.

Thus, a minimum of six temperature sensors are required for complete information of radial temperature profiles at any radial plane. Moreover, these sensors can be installed in any tube of the corresponding set of tubes in each zone. These positions are labeled "s" in FIG. 3.

2. All exothermic (endothermic) reactors have reaction (heating) and cooling (reaction) zones. The length of these sections can be easily determined by the known principles of reactor design. Moreover, hot or cold spots mostly occur in the reaction zones, hence temperature sensors are mostly required in these reaction zones.

The general rules for the location of temperature sensors according to the invention, for accurate and quick identification of hot and/or cold spots in a chemical reactor can thus be formulated as follows:

1. For radial temperature profiles, temperature sensor locations are:
   (a) Center tube 1;
   (b) At least one tube of each set which has approximately equal temperatures based upon tube layout geometry; and
   (c) At a number of equi-spaced radial axes within the reaction zone (line 54 in FIG. 3).

2. For longitudinal temperature profile, location of temperature sensors are:
   (a) Along the center tube only; and
   (b) At a number of equi-spaced points along the central longitudinal axis in the reaction (heating) and cooling (reaction) zones.

It should be noted that temperature sensors in the center tube are the same in both of the above cases. Furthermore, the distance between two radial planes, on which sensors are located, is a function of reactor length, operating temperature band and desired sensitivity.

As noted, the radial placement of the temperature sensors is shown in FIG. 3. The axial placement of the temperature sensors is shown in FIG. 4.

Implementation of hot and cold spot detection method via conventional electronic instrumention is also shown in FIG. 4. This equipment generates an alarm (audio and/or visual) on detection of hot and/or cold spots. Also, it provides these signals for use in modulating, startup and shutdown control systems.

Figure 5A:
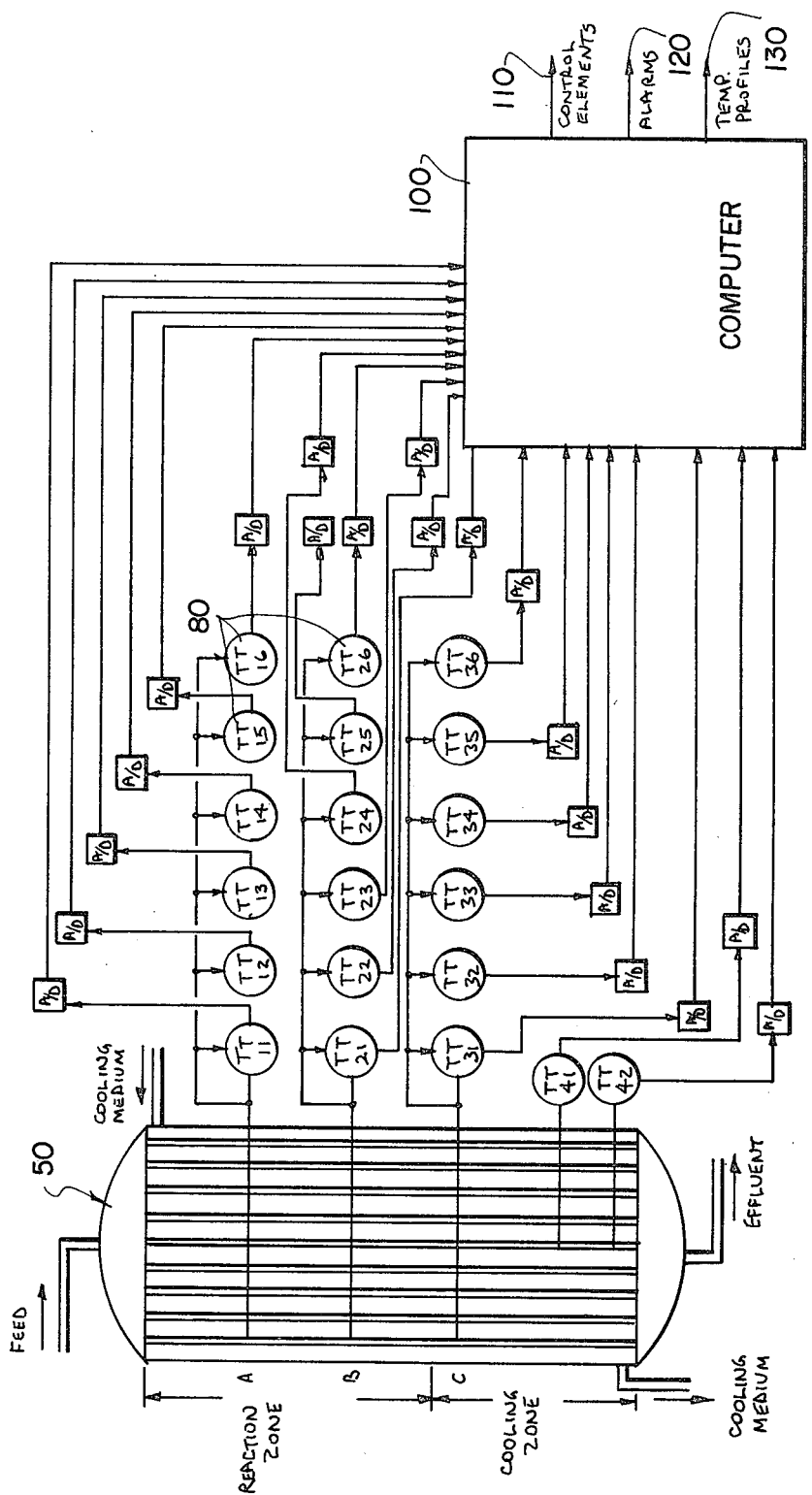
FIG. 5A is view similar to FIG. 4 of a different embodiment of the invention.
Figure 5B:
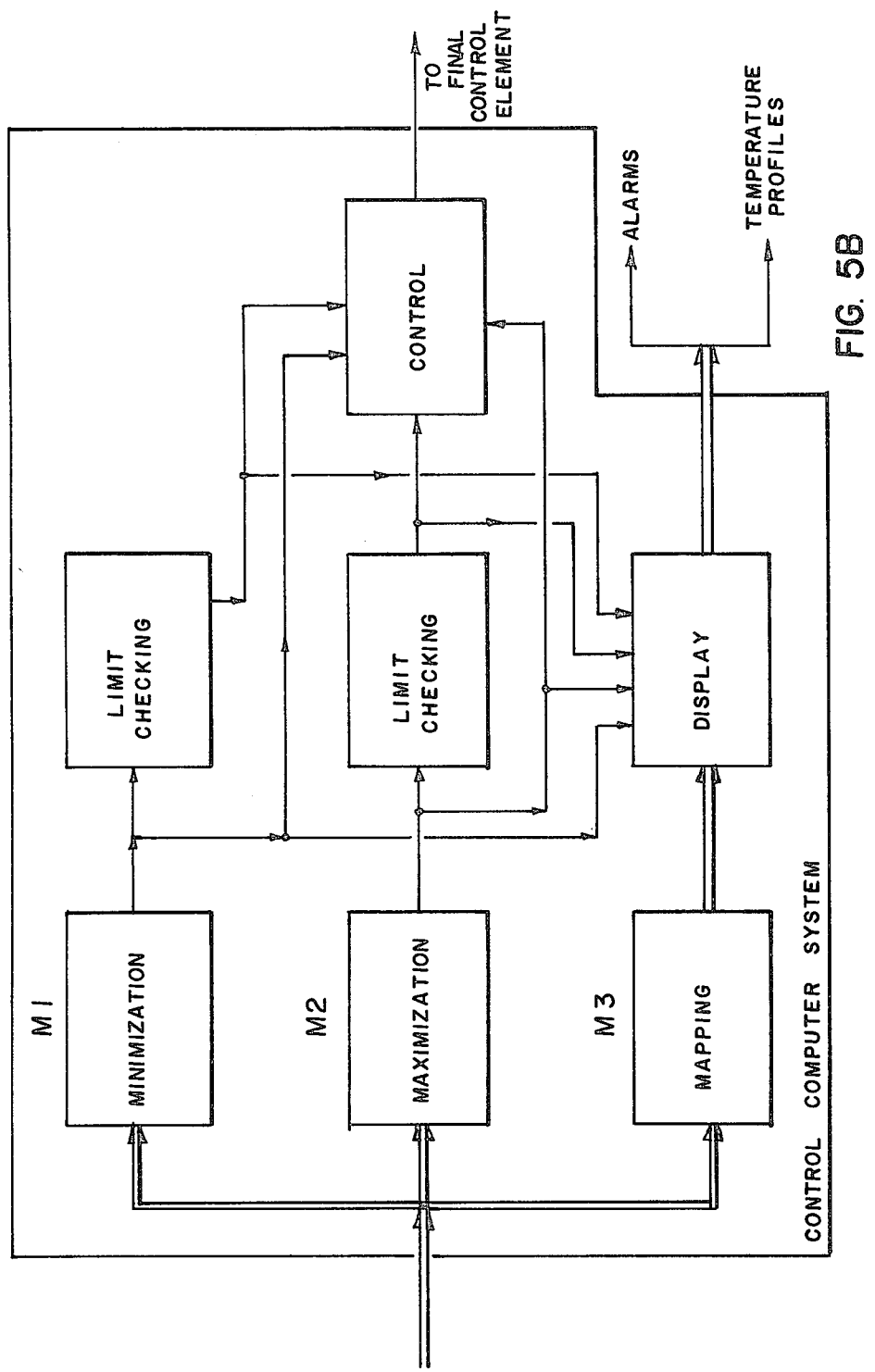
FIG. 5B is a block diagram of a computer which can be used in the embodiment of FIG. 5A.

FIGS. 5A and 5B show an implemention based upon a real-time control computer system 100. This implemention utilizes minimization, maximization, limit checking and display methods which are commonly used in the art, and a mapping technique for temperature profiles described below.

A longitudinal and radial temperature profile at an axis or a plane is determined by the method illustrated below for the reactor configuration of FIG. 3.

(1) Let $T_i$ be the temperature matrix at the $i^{th}$ radial plane of a thermic reactor. The elements of this matrix give the temperature of the corresponding tube in the thermic reactor. For the example case, matrix $T_i$ can be written as $$\begin{bmatrix} a_{11} & a_{12} & a_{13}\,(12) & a_{14} & a_{15} \\ a_{21}\,(21) & a_{22} & a_{23} & a_{24}\,(20) & a_{25} \\ a_{31}\,(13) & a_{32} & a_{33}\,(5) & a_{34}\,(11) & a_{35} \\ a_{41}\,(22) & a_{42}\,(6) & a_{43} & a_{44}\,(4) & a_{45}\,(19) \\ a_{51}\,(14) & a_{52}\,(7) & a_{53}\,(1) & a_{54}\,(2) & a_{55}\,(3) \\ a_{61}\,(23) & a_{62}\,(8) & a_{63} & a_{64}\,(10) & a_{65}\,(18) \\ a_{71}\,(15) & a_{72} & a_{73}\,(9) & a_{74}\,(17) & a_{75} \\ a_{81} & a_{82}\,(24) & a_{83} & a_{84}\,(25) & a_{85} \\ a_{91} & a_{92} & a_{93}\,(6) & a_{94} & a_{95} \end{bmatrix}$$

The subject of each element a has a first digit denoting row (across) number and a second digit denoting column (down).

The number in parenthesis below an element in the matrix $T_i$ denotes the tube number of FIG. 3 with which this element is associated. The elements with no tube number are those for which no corresponding reactor tube exists.

(2) Let $-1$ (minus one) be the value of elements in matrix $T_i$ for which there does not exist a corresponding reactor tube.

(3) From the reactor symmetry on a per quadrant basis we note that elements in column 1 correspond to elements in column 5, elements in column 2 correspond to elements in column 4, elements in row 1 correspond to elements in row 9, elements in row 2 correspond to elements in row 8, elements in row 3 correspond to elements in row 7 and elements in row 4 correspond to elements in row 6.

(4) From (2) and (3) above it follows that matrix $T_i$ can be constructed by constructing one quadrant of matrix $T_i$, for example

| $a_{13}$ | $a_{14}$ | $a_{15}$ |
| $a_{23}$ | $a_{24}$ | $a_{25}$ |
| $a_{33}$ | $a_{34}$ | $a_{35}$ |
| $a_{43}$ | $a_{44}$ | $a_{45}$ |
| $a_{53}$ | $a_{54}$ | $a_{55}$ |

(5) The measured temperatures in this example are $T_1, T_2, T_3, T_{10}, T_{13},$ and $T_{24}$ and $T_{24}$ as per FIG. 3. The value of elements of the quadrant in (4) above is as follows:

| $a_{53}$ | $=$ | $T_1$ | | |
|---|---|---|---|---|
| $a_{54}$ | $=$ | $T_2$ | | |
| $a_{55}$ | $=$ | $T_3$ | | |
| $a_{43}$ | $=$ | $-1$ | | |
| $a_{44}$ | $=$ | $T_4$ | $=$ | $T_{10}$ |
| $a_{45}$ | $=$ | $T_{19}$ | $=$ | $T_{24}$ |
| $a_{33}$ | $=$ | $T_5$ | $=$ | $T_2$ |
| $a_{34}$ | $=$ | $T_{11}$ | $=$ | $T_{13}$ |
| $a_{35}$ | $=$ | $-1$ | | |
| $a_{23}$ | $=$ | $-1$ | | |
| $a_{24}$ | $=$ | $T_{20}$ | $=$ | $T_{24}$ |
| $a_{25}$ | $=$ | $-1$ | | |
| $a_{13}$ | $=$ | $T_{12}$ | $=$ | $T_3$ |
| $a_{14}$ | $=$ | $-1$ | | |
| $a_{15}$ | $=$ | $-1$ | | |

Thus, one quadrant of matrix $T_i$ can be determined.

(6) On replacing column (1) by column (5), column (2) by column (4), row (9) by row (1), row (8) by row (2), row (7) by row (3), and row (6) by row (4) we get the temperature matrix $T_i$, given below:

| $-1$ | $-1$ | $T_{13}$ | $-1$ | $-1$ |
|---|---|---|---|---|
| $-1$ | $T_{24}$ | $-1$ | $T_{24}$ | $-1$ |
| $-1$ | $T_{13}$ | $T_2$ | $T_{13}$ | $-1$ |
| $T_{24}$ | $T_{10}$ | $-1$ | $T_{10}$ | $T_{24}$ |
| $T_3$ | $T_2$ | $T_1$ | $T_2$ | $T_3$ |
| $T_{24}$ | $T_{10}$ | $-1$ | $T_{10}$ | $T_{24}$ |
| $-1$ | $T_{13}$ | $T_2$ | $T_{13}$ | $-1$ |
| $-1$ | $T_{24}$ | $-1$ | $T_{24}$ | $-1$ |
| $-1$ | $-1$ | $T_3$ | $-1$ | $-1$ |

(6) Radial temperature profile: A plot of values of all the elements in either any row or any column of the matrix $T_i$ gives radial temperature profile at the $i^{th}$ plane.

(7) Longitudinal Temperature profile:

The Longitudinal temperature profile is obtained by plotting the values of an element $a_{jk}$ of matrix $T_i$ for all radial temperature matrices. For example, the longitudinal temperature profile can be obtained by plotting the value of element $a_{53}$ in radial temperature matrices $T_1$, $T_2$, $T_3$, $T_4$, etc.

It should be noted that there is no radial temperature matrix in the cooling (heating) zone of a reactor.

The above methodology can be easily implemented on a control computer system and extended to thermic reactors containing any number of tubes.

An example of the reaction which can be contained in reactor 50 is the manufacture of ethylene oxide via oxidation of ethylene in the presence of silver catalyst in a tubular reactor is an exothermic reaction given by:

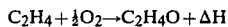

where $\Delta H$ is the exothermic heat of reaction.

Temperature profiles can also be generated by conventional electronic instrumentation if one so desires. These temperature profiles can be used in reactor operation, thus providing a better understanding of the state of the catalyst.

While the invention has been disclosed in connection with a once-through multi-tubular reactor, it can be adapted for all other isothermic reactors, for example, tubular flow recycle reactors, radial flow catalytic reactors and the like.

In addition to providing quick and accurate detection, both of longitudinal and radial temperature profiles, the present invention, when used in reactor operation, increases catalyst life, reduces the formation of by-products, reduces cooling and heating fluid demand, reduces the amount of operator attention required for safe reaction operation, and thereby reduces the occurrence of unsafe conditions.

As noted, the radial placement of the temperature sensors is shown in FIG. 3. The axial placement of the temperature sensors is shown in FIG. 4.

Implementation of hot and cold spots detection method via conventional electronic instrumention is also shown in FIG. 4. This equipment generates an alarm (audio and/or visual) on detection of hot and/or cold spots. Also, it provides these signals for use in modulating, startup and shutdown control systems.

FIGS. 5A and 5B show an implementation based upon a real-time control computer system 100. This implementation utilizes minimization, maximization, mapping, limit checking and display methods which are commonly known in the art.

Temperature profiles can also be generated by conventional electronic instrumentation. These temperature profiles can be used in reactor operation, thus providing a better understanding of the state of the catalyst.

While the invention has been disclosed in connection with a once-through multi-tubular reactor, it can be adapted for all other isothermic reactors, for example, tubular flow recycle reactors, radial flow catalytic reactors and the like.

In addition to providing quick and accurate detection, both of longitudinal and radial temperature profiles, the present invention increases catalyst life, reduces the formation of by-products, reduces cooling and heating fluid demand, reduces the amount of operator attention required for safe reactor operation, and thereby reduces the occurrence of unsafe conditions.

Referring to the embodiment of the invention shown in FIG. 4, the reactor 50 includes an upper reaction zone 60, which is provided with the majority of the temperature sensors, and a lower cooling zone 70 which is provided with fewer temperature sensors. Each of the temperature sensors is connected to its own temperature transmitter 80. It is noted that in each of the three cross-sectional planes of the reaction zone 60, six temperature transmitters are provided for the six temperature sensors at each plane. Two additional temperature sensors are provided at the central tube 1 in the cooling zone 70. The reactor vessel 56 is provided with reactants over a feed line 58 and effluent is discharged over a discharge line 62. Heat transfer medium, which in the example shown is cooling medium, is provided over a feed line 64 and discharged over a discharge line 56. The temperature transmitters 80 are connected to maximum and minimum sensing circuitry generally designated 82 which provides output signals for monitoring and safety control systems at 84. The operation of the circuity is known so that additional details are not provided here.

Referring to FIG. 5A, where similar references numerals designated similar elements, a computer 100 is utilized to receive the signals from the various temperature transmitters 80 and produce final control signals over line 110, alarm signals over line 120 and temperature profile signals over line 130.

FIG. 5B shows additional details for computer 100.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which preferred embodiments of the invention are illustrated.

What is claimed is:

1. An apparatus for determining the temperature gradient in an isothermic chemical reactor having a longitudinal axis and a plurality of longitudinally extending heat transfer medium tubes, one tube coinciding with said longitudinal axis, comprising, a first plurality of temperature sensors distributed at equispaced locations along said tube, and a second plurality of at least six temperature sensors on a cross-sectional plane of the reactor passing through each of said locations, said longitudinally extending tubes grouped into sets of tubes each within an equitempered zone axially symmetrical about the longitudinal axis, at least one temperature sensor of said second plurality of temperature sensors in one tube of each set, some of said second plurality of temperature sensors equispaced along a radial line in each cross-sectional plane.

2. An arrangement of minimizing temperature sensors for plotting a temperature profile in an isothermal chemical reactor having a longitudinal axis and a cylindrical quadrant geometry with a plurality of equitempered zones symmetrical about the longitudinal axis comprising:

a first plurality of temperature sensors disposed at selected equispaced locations along said longitudinal axis; and
   a second plurality of at least six temperature sensors distributed on a cross-sectional plane of the reactor at each selected equispaced location on said longitudinal axis with at least one temperature sensor in each equitempered zone but at different locations of each zone to thus define a temperature profile of each zone.

3. An arrangement according to claim 2, wherein the reactor is cylindrical and includes a plurality of longitudinally extending heat transfer medium tubes, one of said tubes lying along said longitudinal axis, a plurality of said tubes disposed in each of said equitempered zone, each of said first and second plurality of temperature transducers associated with one of said tubes.

4. A method of arranging temperature sensors in a reactor for containing a thermic reaction and having a longitudinal axis and a cross-sectional geometry with a plurality of equitempered zones symmetrical about said longitudinal axis, comprising the steps of distributing a first plurality of temperature sensors at equispaced locations along said longitudinal axis, and a second plurality of at least six temperature sensors in a cross-sectional plane at each location with at least one temperature sensor in each equitempered zone and some of said temperature sensors distributed at equispaced locations along a radial line in each cross-sectional plane.

5. A method of arranging temperature sensors in a reactor for containing a thermic reaction and having a longitudinal axis and a cross-sectional geometry with a plurality of equitempered zones symmetrical about said longitudinal axis, comprising the steps of distributing a first plurality of temperature sensors at equispaced locations along said longitudinal axis, and a second plurality of at least six temperature sensors in a cross-sectional plane at each location with at least one temperature sensor in each equitempered zone and some of said temperature sensors distributed at equispaced locations along a radial line in each cross-sectional plane, wherein a longitudinal and radial temperature profile can be obtained in the reactor, comprising dividing said cross-sectional geometry of the reactor at each cross-sectional plane into a matrix of temperature elements assembled into columns and rows, the reactor having a plurality of tubes, at least some of which correspond to some of said elements, assigning a value equal to temperature value of each tube assigned to each element respectively, assigning a value -1- to each remaining element of the matrix not having a corresponding tube in the reactor, at least some rows and columns being equivalent to at least some other rows and columns due to the cross-sectional geometry of said reactor, substituting said equivalent rows as far as possible to provide a reduced matrix having tubes for which a temperature is provided.

* * * * *